United States Patent [19]
Cole

[11] 4,159,089
[45] Jun. 26, 1979

[54] VARIABLE CAMBER FLAP

[75] Inventor: James B. Cole, Mercer Island, Wash.

[73] Assignee: Boeing Commercial Airplane Company, Seattle, Wash.

[21] Appl. No.: 801,662

[22] Filed: May 31, 1977

[51] Int. Cl.² .............................................. B64C 3/50
[52] U.S. Cl. ..................................... 244/214; 244/219
[58] Field of Search ................ 244/214, 219, 216, 215

[56] References Cited
U.S. PATENT DOCUMENTS 3,941,334 3/1976 Cole ..................................... 244/214

Primary Examiner—Barry L. Kelmachter
Attorney, Agent, or Firm—H. Gus Hartmann; Bernard A. Donahue

[57] ABSTRACT

A variable camber leading edge flap and linkage mechanism for allowing two different extended operating positions of the flap, i.e. a landing position whereat an aerodynamic slot is formed between the aft edge of the flap and the fixed leading edge of the wing, coupled with a relatively steep flap angle relative to the wing chord plane; and a take-off position whereat the aerodynamic slot is closed and the flap angle is less than at the landing position. Also, a pair of cam mechanisms are interposed between linkages and sequenced in their operating functions to alternately restrain and release certain of the linkage members in order to open or close the aerodynamic slot and change the flap angle in a manner that insures that air loads acting on the variable camber flap do not cause linkage oscillation and flap instability. Further, through ball joint connections between the flap member and its actuating linkage mechanism, and by altering the degree of angular rotation of the spanwise spaced sets of flap linkage mechanisms, the flap panel can be made to twist torsionally spanwise along the wing leading edge providing a variable flap angle and aerodynamic slot to improve the aerodynamic efficiency of the wing and flap combination.

15 Claims, 9 Drawing Figures

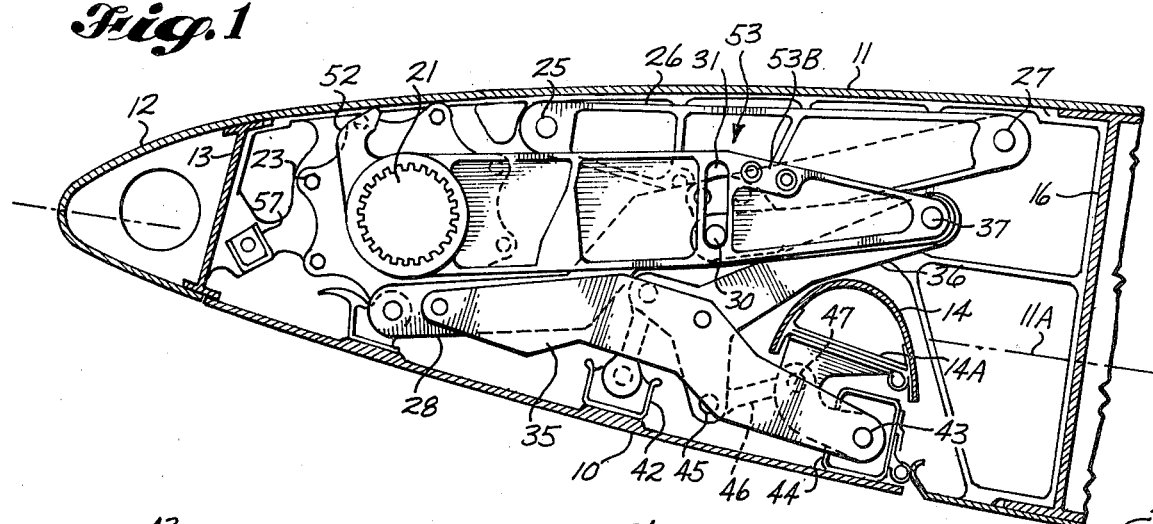
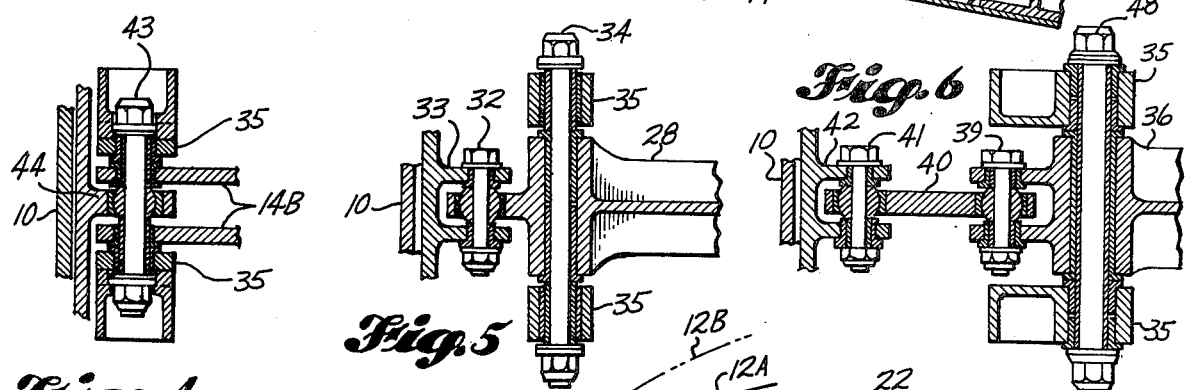
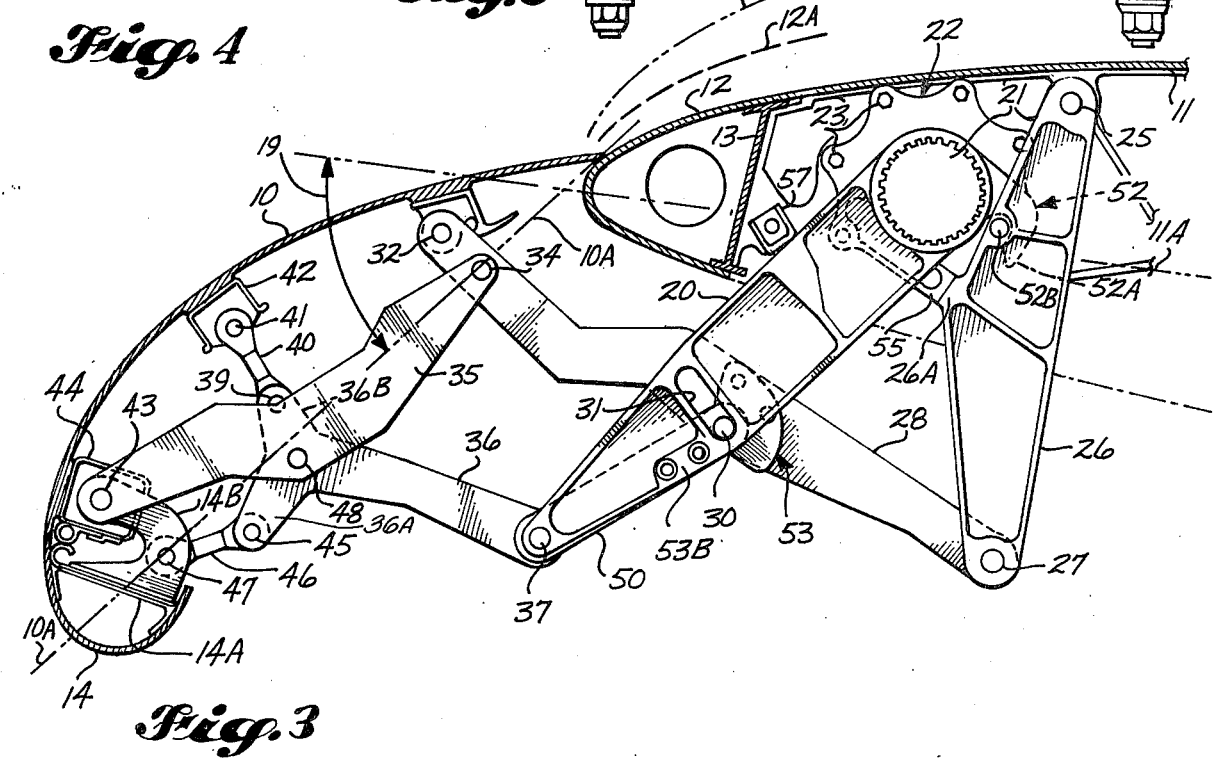

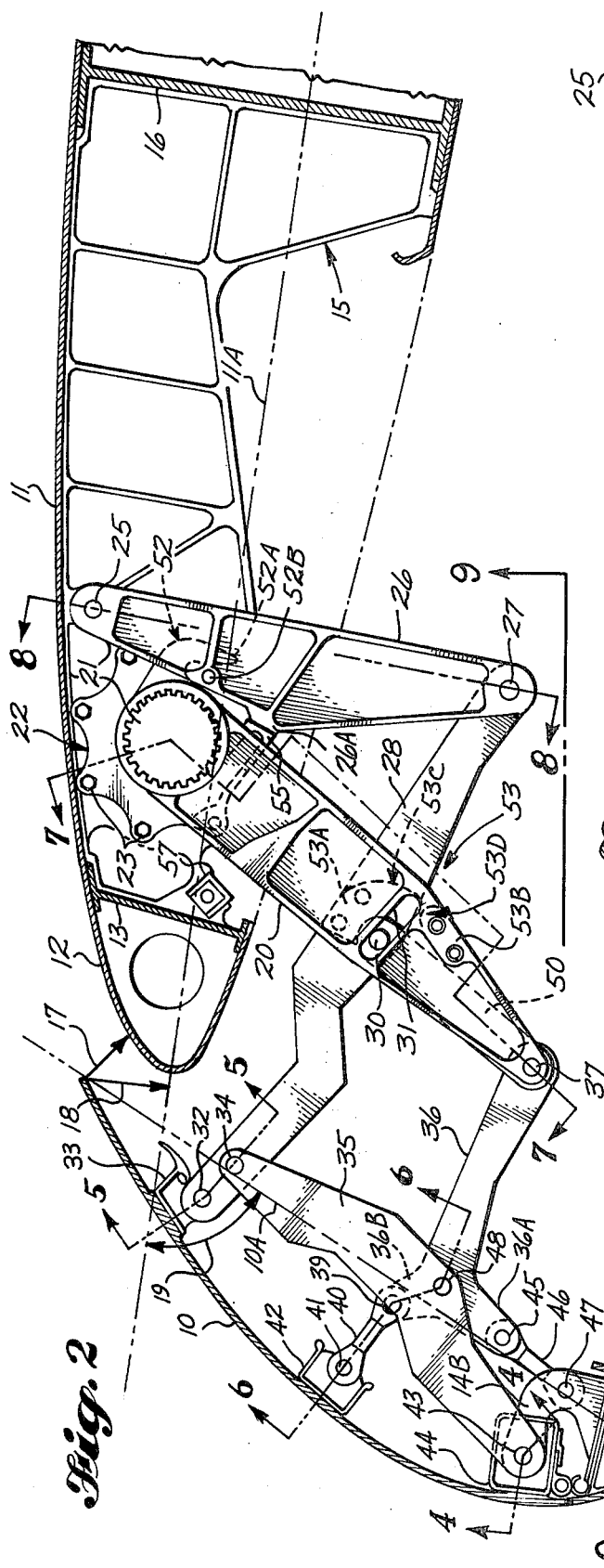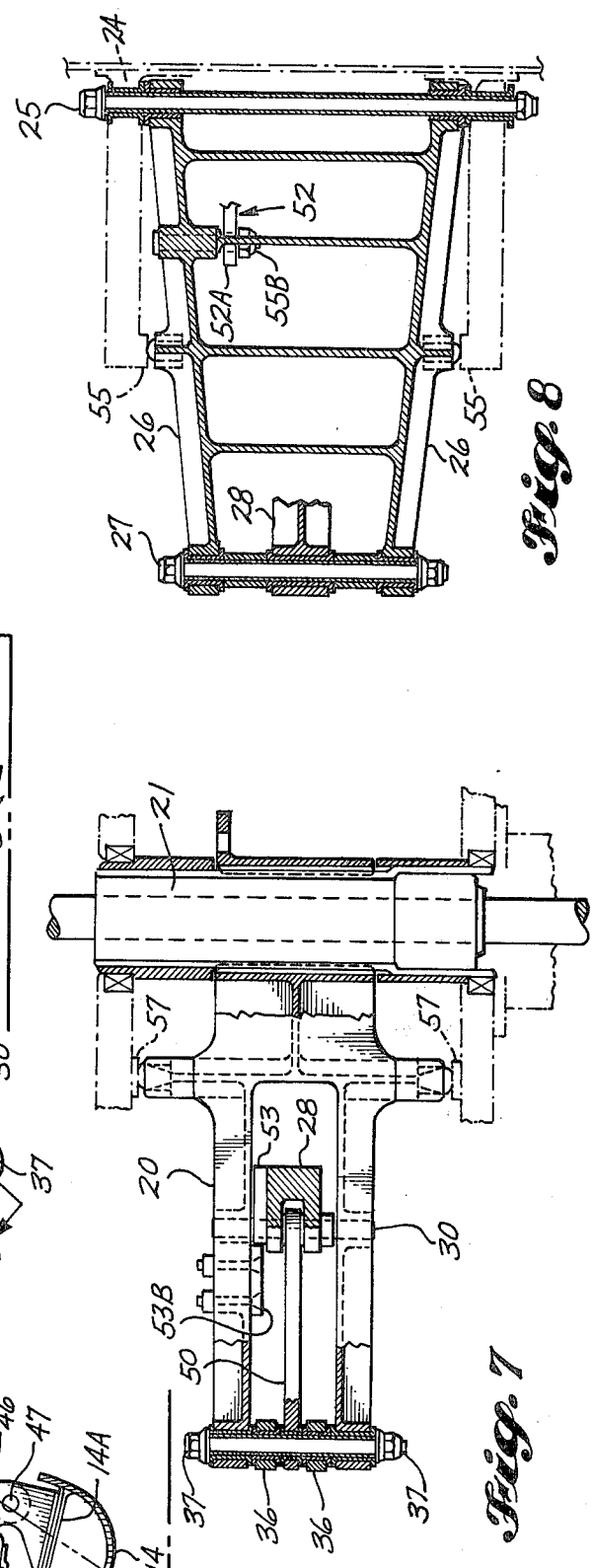

VARIABLE CAMBER FLAP

SUMMARY OF THE INVENTION

The invention is directed to a variable camber leading edge flap of the general type shown in U.S. Pat. No. 3,504,870, issued to Cole on Apr. 7, 1970 and more particularly to a flap linkage mechanism that will allow the flap to be positioned at two different extended locations relative to the wing airfoil section.

For optimum aerodynamic performance during the landing mode of airplane operation, the flap linkage mechanism extends the flap from a stowed position beneath the wing of the airplane, to a first extended operating position in front of the wing, there to form an aerodynamic slot between the aft edge of the flap and the leading edge of the wing.

For improving the wing drag characteristics during the take-off mode of airplane operation, the flap is extended further forwardly from said first extended position to a second extended operating position whereat the aerodynamic slot is closed-off and the trailing edge of the flap is at an abutment relationship with the leading edge of the wing.

Further, to optimize the aerodynamic performance of the wing during the take-off mode of airplane operation, the flap angle, which is measured downwardly and forwardly from the wing chord plane, is less than when the flap is positioned for the landing mode.

To maintain the rigidity of an extended variable camber flap mechanism against the air loads encountered during landing and take-off, the linkage mechanism of the present invention incorporates an interacting dual cam mechanism and stop means. There is an interacting over-lapping function between each of the two cam mechanisms during the movement of the flap between the two forward extended operating positions; which overlapping function makes certain that one cam mechanism has secured certain linkages against further movement before the other cam mechanism releases or secures others. Further, the linkage mechanism is geometrically arranged so as to move the flap completely into and out of the fixed wing leading edge contour, with a positively controlled movement.

BRIEF DESCRIPTION OF THE DRAWINGS

FIG. 1 is a chordwise cross-sectional view of the variable camber leading edge wing flap in the stowed position whereat it completes the undersurface profile of the fixed wing.

FIG. 2 is a view similar to FIG. 1 with the leading edge flap extended to a first operative position whereat an aerodynamic slot is formed between the leading edge of the fixed wing structure and the trailing edge of the extended flap; and this position is generally used for the landing mode of airplane operation.

FIG. 3 is a view similar to the preceding view of FIGS. 1 and 2, showing the flap at a further extended second operative position, whereat the aerodynamic slot depicted in FIG. 2 is closed-off and the combined flap and fixed wing form a substantially continuous upper surface; and this flap position is generally used for the take-off mode of airplane operation.

FIG. 4 is a sectional view taken along the lines 4—4 of FIG. 2 in the direction indicated.

FIG. 5 is a sectional view taken along the lines 5—5 of FIG. 2 in the direction indicated.

FIG. 6 is a sectional view taken along the lines 6—6 of FIG. 2 in the direction indicated.

FIG. 7 is a sectional view taken along the lines 7—7 of FIG. 2 in the direction indicated.

FIG. 8 is a sectional view taken along the lines 8—8 of FIG. 2 in the direction indicated.

DESCRIPTION OF THE PREFERRED EMBODIMENTS

Figure 9:
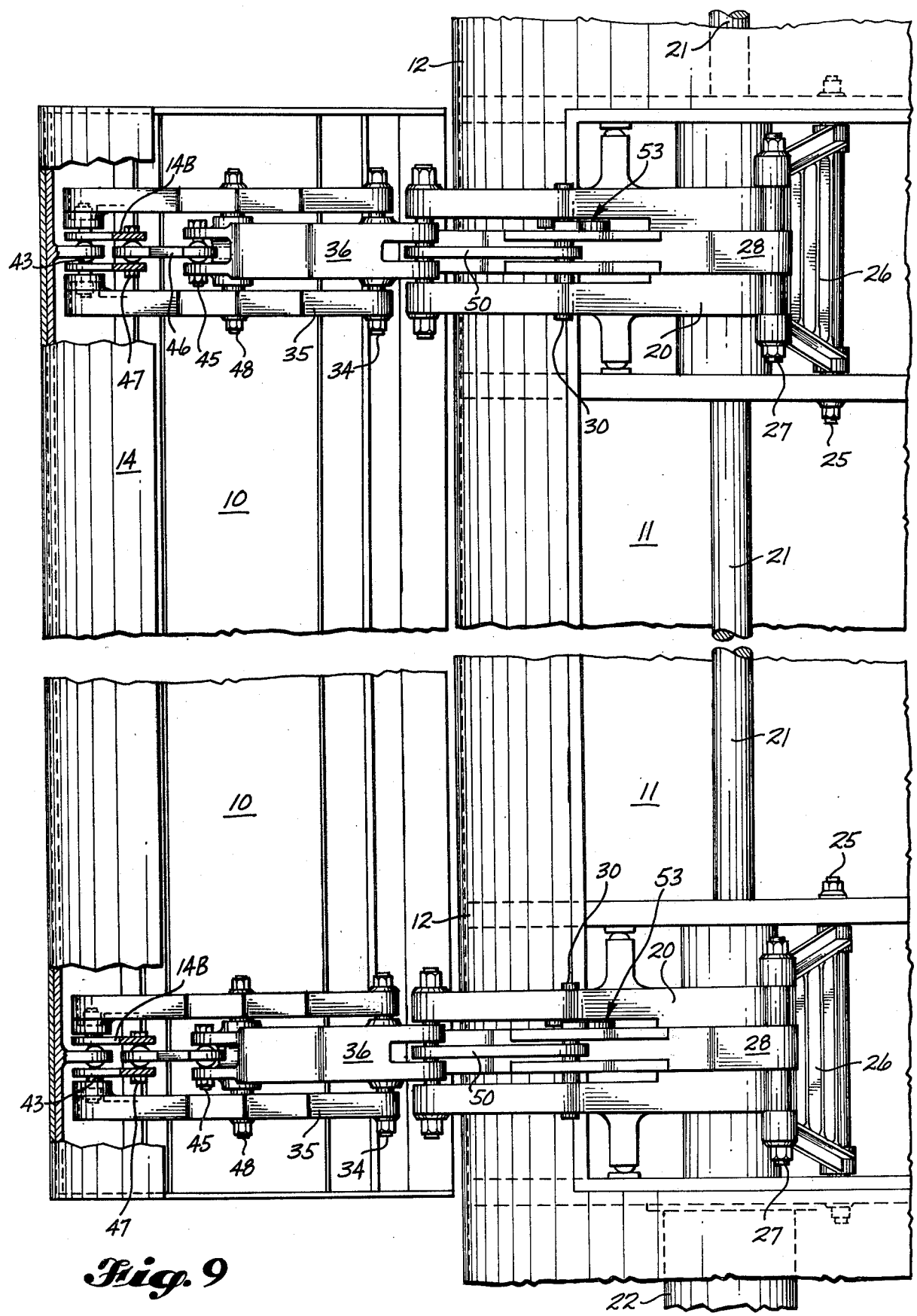
FIG. 9 is a bottom plan view taken in the direction 9—9 indicated on FIG. 2 and depicts a spanwise flap segment with a dual spaced apart flap extension and retraction mechanism interconnected by a torque tube.

FIGS. 1 to 3 are chordwise cross-sectional views of the preferred embodiment of the three-position variable camber leading edge flap of the present invention and its linkage mechanism arranged at different stages of flap operation, i.e. retracted, extended with an aerodynamic slot and extended without the slot. The upper surface of the flap comprises a flexible skin panel 10 which is flexed in a predetermined and controlled manner through a series of spanwise sets of linkage mechanisms, as shown in FIG. 1 of my U.S. Pat. No. 3,504,870, issued on Apr. 7, 1970, which are arranged and actuated in a chordwise plane.

FIGS. 4 to 8 are sectional views taken along the lines indicated in FIG. 2.

Although the leading edge flap mechanism appears somewhat similar to that disclosed in my U.S. Pat. No. 3,504,870, there are some differences in the linkages and their arrangement which results in a slightly different kinematic positioning of the flap relative to the fixed portion of the wing, which will be more fully described hereinafter.

FIG. 1 shows the variable camber leading edge flap in its fully retracted position where it is stowed within the airfoil envelope of the wing. The wing airfoil envelope comprises an upper surface skin panel 11 having a rigid leading edge nose structure 12, a spanwise nose beam 13, and an undersurface including the flap panel 10 with its folding nose section 14. The wing upper surface skin panel 11 and the attached rigid leading edge nose structure 12, are supported by a chordwise wing rib 15 which is in turn fixedly attached to a spanwise wing structural member such as a front wing spar 16.

FIG. 2 shows the flap panel 10 with its folding nose section 14, extended to a first operative position whereat an aerodynamic slot 17 is formed between the flap trailing edge and the wing leading edge; and at this extended position, the flap is generally used for the landing mode of airplane operation.

Referring to FIG. 2, the flap linkage mechanism comprises a driving arm 20 splined to a torque shaft 21 of a rotary actuator 22, which in turn is fixedly connected through bolts 23 to the chordwise wing rib 15. Spaced chordwise aft of the driving arm connection is an attachment point on rib 15 for the pivotal attachment at 25 of the upper end of a support arm 26. The lower end of support arm 26 is pivotally connected at 27 to a horizontal main flap support link 28. The mid-portion of link 28 is connected to the driving arm 20 through an interconnecting link 50 and pin connections 30 and 37, the function of which will be described in greater detail hereinafter. The forward portion of the main flap support link 28 is pivotally connected at 32 to the aft portion of the flexible flap panel 10 through a bracket 33, and also, at pivotal connection 34 to a flap chord link 35 which is approximately parallel to the driving arm 20 in the extended position shown. Approximately parallel to the horizontal main flap support link 28 in the first extended position shown in FIG. 2, is a secondary flap support link or Y-bellcrank 36 which at its aft end is pivotally connected at 37 to the lower end of driving arm 20. The forward end of link 36 is formed into a Y-fork having arms or branches 36A and 36B integral therewith. At the intersection of the arms, the Y-bellcrank 36 is pivotally connected at 48 to an intermediate section of the flap chord link 35. The branch 36B connects at pivot 39 to the lower end of a short link 40 which in turn is connected at its upper end at 41 to an intermediate portion of the flexible flap panel 10 through bracket 42, for curvature control of the aerodynamic shape. The forward lower end of flap chord link 35 is pivotally connected at 43 to the forward portion of the flexible flap panel 10 through a bracket 44. The forward lower end of the secondary flap support link 36, through branch 36A, is connected at 45 to one end of a short link 46 which in turn is connected at its other end at 47 to a spanwise nose beam 14A that forms the support structure for a rounded leading edge structure or bull nose 14 for the flap. The bull nose 14 has an arm 14B structurally integral therewith, through which it is supported and mounted at pivot 43 for rotation on the lower end of flap chord link 35.

Referring back to the mid-portion of main flap support link 28, and the pin 30 and slot 31 arrangement, the slot 31 on the driving arm 20 is not designed to serve as a support connection for the main flap support link 28 through the pin 30; neither is the pin 30 guided in the slot 31, because the mid-length support for the link 28 takes place at the end of the driving arm 20 at pivot 37, through an interconnecting link 50 which is shown in dashed outline underneath and separate from the driving arm 20 in FIGS. 1-3 and in the sectional view of FIG. 8 which is taken along the lines 8—8 of FIG. 2. The upper end of this interconnecting link 50 is connected through a fixed pivot 30 to the approximate mid-length of horizontal main flap support link 28; and the lower end of this link 50 is connected through a pivot 37 which is common to both the end of the driving arm 20 and the secondary flap support link 36. The mid-length joining of the main flap support link 28, through the interconnecting link 50, to the secondary flap support link 36 maintains the integrity of the flap linkage mechanism; so that the nose section of the flap does not become unstable as it might do if the main flap support link 28 were pin connected to the driving arm 20 through the slot 31 instead of through the interconnecting link 50. Although the slot 31 is not being depended upon for attachment of the driving arm 20 to the main flap support link 28, it does serve as a clearance opening for pin 30; also, the ends of the slot 31 function as a stop plate for the pin 30 and limits the fore and aft movement of the horizontal main flap support link 28 relative to the driving arm 20 when the flap is moved between the two forward extended operating positions, shown in FIGS. 2 and 3.

Referring to FIG. 2, a second cam mechanism 52 is off-set from the center of rotation of the drive arm 20 and a first cam mechanism 53 is located at the intersection of the drive arm 20 and the horizontal main flap support link 28.

The second cam mechanism 52 comprises a hook-like protrusion or locking cam 52A which has an inner cam surface and detent for engaging and holding a follower pin 52B; and the function of this cam mechanism is as follows: when the flap 10 is initially extended from the stowed position shown in FIG. 1 to its first extended operating position shown in FIG. 2, the driving arm 20 rotates clockwise and the locking cam 52A which is rotatable therewith, has engaged the follower pin 52B which is fixedly attached to the support arm 26; and when the driving arm 20 is at the position indicated in FIG. 2, the further forward or clockwise rotation of the support arm 26 is arrested by the stop means 55 abutting the surface 26A thereof. Thereby, the second cam mechanism 52 completely locks the support arm 26 against the stop means 55 so that there can not be any further movement thereof.

The first cam mechanism 53 comprises: a cam 53A fixedly attached to the horizontal main flap support link 28; and a follower 53B which is a plate fixedly attached to the undersurface of the driving arm 20 as more clearly seen in the sectional view of FIG. 7. The function of this cam mechanism is to prevent rotation of the interconnecting link 50 by retaining the pin 30 at one end of the slot 31 as the flap is being extended from its stowed position shown in FIG. 1 to its first extended operating position shown in FIG. 2. The operation of the first cam mechanism 53 during transition of the flap from its stowed position to its first extended operating position, is a follows: as the flap is being initially extended by the rotary actuator 22 moving the driving arm 20 clockwise about the axis of the torque shaft 21, the cam follower plate 53B bears against the curved surface 53C of the cam 53A and essentially retains the pin 30 at the forward upper end of the slot 31; and as long as this cam follower plate 53B bears against the curved surface 53C of the cam 53A, there will be no slotwise movement of pin 30, nor will there be any relative movement between the main flap support link 28 and the driving arm 20, other than a rotational movement about the relatively fixed common pivotal point 30.

There is an interconnecting operating function between the two cam mechanisms 52, 53, in permitting the flap extension linkage mechanism to controllably position the flap at the two forward extended operating positions shown in FIG. 2 and FIG. 3. Also, there is an overlap in the sequential operating function between these two cam mechanisms in their alternate restraint and release of the different links of the flap linkage mechanism, e.g. when the locking cam 52A begins to engage or clasp the pin 52B, the cam follower plate 53B is still bearing against the curved surface 53C of the cam 53A, i.e. the cam follower plate 53B has not yet cleared or come-off of the curved cam surface 53C, so as to bear against the flat cam surface 53D.

The purpose of the second cam mechanism 52 may be better understood from the following situation. If the second cam mechanism 52 were to be removed and the position of the cam elements of the first cam mechanism 53 were as shown in FIG. 2, wherein the cam follower plate 53B has cleared or come-off of the curved cam surface 53C so as to permit relative movement of pin 30 in slot 31, then the air loads acting on the flap 10 would result in an aft or forward movement of the main flap support link 28 relative to the driving arm 20. This would cause an oscillating change-of-flap-angle relative to the wing chord plane 11A, and the flap would therefore be unstable. So, in order to keep the flap from being pushed backwards and becoming unstable, the locking cam 52A, of the second cam mechanism 52, clasps the pin 52B and through an abutment relationship between the stop means 55 and the surface 26A, thereby locks the support arm 26 against further movement and restrains the flap 10 from moving back and forth.

FIG. 3 shows the flap at a further extended second operating position whereat an abutment or non-gap relationship exists between the leading edge of the fixed wing structure and the trailing edge of the extended flap. For aerodynamic reasons, it is preferable that the slot 17 be sealed up during the take-off mode of airplane operation because there is a certain amount of drag associated with it; and by closing the slot 17 and keeping the airflow from circulating between the flap and the wing, the drag is reduced and the airplane is capable of accelerating much faster for take-off. Further, to increase the acceleration of the airplane for take-off, it is more advantageous to have less of a flap angle 19 than for landing, i.e. the angle 19 that the flap chord line 10A makes with respect to the wing chord line 11A, as indicated by the change in position of the flap between FIGS. 2 and 3.

In order for the linkage mechanism to change the flap angle 19, between that shown in FIG. 2 and that shown in FIG. 3, the support arm 26 is restrained from further clockwise rotation by the stop means 55; and this in turn, through the horizontal main flap support link 28 and its outer connection 32, holds the aft portion of the flap relatively fixed with respect to the leading edge of the wing. However, as the driving arm 20 continues in its clockwise rotation, it pushes the forward portion of the flap, through pivot 37 and link 36, so that the flap essentially is pivoted about its aft attachment point 32 and thereby closes off the aerodynamic slot 17. It should be noted however, that as the drive arm 20 is rotated clockwise from the position shown in FIG. 2, an adjustable stop 57 which is fastened to the chordwise wing rib 15, restrains the further clockwise rotation of drive arm 20; and through the operation of the second cam mechanism 52, as previously described, the support arm 26 is rigidly held against the stop 55. Therefore, with the support arm 26 held in the fixed position, the main flap support link 28 and the aft portion of the flap connected thereto, will not be capable of oscillating back and forth due to air loads impinging on the flap during the transitional extension thereof from the aerodynamic slot position of FIG. 2 to the closed slot position of FIG. 3.

FIG. 9 is a bottom plan view taken in the direction 9—9 indicated in FIG. 2 and shows a spanwise flap segment supported from the leading edge of the wing by a pair of spaced apart linkage mechanisms which are operatively interconnected by the torque shaft 21.

In many applications of a variable camber flap, it may be desirable to skew or taper the flap to produce different contours at the ends of the flap in order to more closely match the wing airfoil contours that vary spanwise. However, the dual journal bearing type of attachments of the linkage to the flexible flap panel shown in my U.S. Pat. No. 3,504,870 forces the plane of the linkage to remain perpendicular to the spanwise elements of the cambered flap panel during extension and retraction operation of the flap; therefore, this arrangement restricts the flap to cylindrical geometries; i.e. identical contours at each end of the flap.

A second embodiment of the invention relates to varying the angle of the flap panel spanwise along the wing leading edge, by imparting a twisting affect to the spanwise flap panels. This produces a tapered slot geometry and improves the aerodynamic characteristics of the flap-to-wing relationship from root to tip of the wing. Further, this twisting of the flap panel spanwise can also be incorporated when the flap panel is in the take-off mode of airplane operation or with the aerodynamic slot closed off. This twisting spanwise of the flap panel can be accomplished in the present invention by having the flap panel connected to the linkage mechanism through a chordwise series of ball joints, as shown in FIGS. 4, 5 and 6 at pivotal connections 32, 41 and 43; in combination with a slight variation in the angular rotation of the flap linkage mechanism at one spanwise location relative to a chordwise flap linkage mechanism spaced spanwise therefrom. The modified linkage arrangement of this disclosure, wherein single point, mono-ball bearing joint type of attachments 32, 41, and 43 of the linkage to the flexible flap panel 10 are used, will allow the plane of the flap panel to deviate from perpendicular relative to the plane of the linkage; and allow skewed flap contours.

The flap linkage geometry is adjustable to accommodate the change in airfoil section at the various spanwise locations on the wing. Referring to FIG. 2, if the driving arm 20 and the associated flap linkage mechanism were rotated a different number of degrees depending upon their spanwise location, then the width of the aerodynamic slot 17 could be tapered spanwise and the flap angle varied with relation to the wing to provide optimum aerodynamic performance. However, it is preferable from an economy standpoint that the drive arm 20 be rotated to the same number of degrees for each of the spanwise locations of the flap linkage mechanism. A means for adjusting the width of the aerodynamic slot 17 and flap angle 19 at the different spanwise locations along the wing with a constant drive arm 20 rotation is described as follows. Referring to FIGS. 2 and 3, the position of the flap relative to the wing airfoil profile on the inboard portion of the wing is shown in dash-dot line 12B; the dashed outline 12A depicts the leading edge upper surface of the wing airfoil section at approximately mid-span of the wing; and the solid outline 12 indicates the leading edge upper surface of the wing section at the tip portion of the wing. Assuming that the driving arms 20 of the various spanwise located flap linkage mechanisms are driven the same number of degrees of rotation, and if the clockwise rotation of support arm 26 were arrested by stop means 55 at a slightly earlier position than that shown in FIG. 2, which earlier position could be made by repositioning the stop means 55 or by screw fastening shim sheets or washers to the face of stop 55, then the aerodynamic slot 17 would be narrower and the flap angle 19 less for that particular location of the flap linkage mechanism; and conversely, if the support arm 26 were stopped at a slightly later position or at a greater angle of rotation, then the aerodynamic slot 17 would be widened and the angle greater. Therefore, the width of the aerodynamic slot 17 and the flap angle 19 can be regulated depending on where the support arm 26 is stopped during its clockwise rotation. In addition to the adjustment of the support arm stop 55 it will also be necessary to reposition the driving arm stop means 57.

While the invention has been disclosed with reference to a preferred embodiment, it is to be understood that those modifications and changes which become obvious to a person skilled in the art to which this invention pertains, as a result of the teachings hereof, are considered to be encompassed by the following claims.

What is claimed is:

1. A linkage mechanism for extending a flap from a stowed position within the undersurface of an airfoil to a first forward and downward extended operating position forming an aerodynamic slot with the leading edge of the airfoil, comprising: a driving arm mounted to fixed structure of the airfoil for rotation in a chordwise plane; a support arm spaced chordwise aft of the driving arm and mounted at its upper end to fixed structure of the airfoil for rotation in a chordwise plane; a main flap support link extending chordwise fore and aft, and being pivotally connected at its aft end to the lower end of the support arm and pivotally connected at its forward end to a trailing edge portion of the flap; an interconnecting link pivotally connected at its lower end to the lower end of the driving arm and pivotally connected at its upper end to an intermediate portion of the main flap support link; a flap chord link pivotally supported at its upper end from the forward portion of the main flap support link and pivotally connected at its lower end to a leading edge portion of the flap; a secondary flap support link spaced below and approximately parallel to the main flap support link, and being pivotally connected at its forward end to an intermediate section of the flap chord link and pivotally connected at its aft end to a common pivotal connection with the lower ends of both the driving arm and the interconnecting link; a first means interposed between the driving arm and the main flap support link for initially maintaining a fixed pivotal relationship therebetween during movement of the flap from the stowed position to the first extended operating position; stop means for limiting further forward rotational movement of the support arm from said first extended operating position; and said first means releasing the driving arm from said fixed pivotal relationship with the main flap support link, when the flap has reached said first extended operating position, for permitting a further movement of the driving arm to extend the flap to a second operating position whereat the aerodynamic slot is closed off.

2. The flap linkage mechanism as set forth in claim 1, wherein said first means comprises: a cam fixedly attached to the main flap support link at the pivotal connection of the interconnecting link to the intermediate portion of the main flap support link; a follower fixedly attached to the driving arm; and said first means initially providing for said fixed pivotal interconnecting relationship between the main flap support link and the driving arm during extension of the flap to said first operating position, and then providing for a movable relationship therebetween when the flat is moved between said first and second operating positions.

3. The flap linkage mechanism as set forth in claim 1, further including a second means comprising: a cam hook off-set from the center of rotation of the driving arm and mounted for rotation therewith; a follower pin fixedly attached to the support arm; and said cam hook clasping the follower pin during extension of the flap to said first operating position for locking the support arm against any further movement thereof when the flap has reached said first operating position.

4. The flap linkage mechanism as set forth in claim 3, wherein said first and second means are sequenced in their operating functions such that said second means starts to lock the support arm against further movement before the first means releases the driving arm from its fixed pivotal relationship with the main flap support link, in order that the air loads acting on the flap at said first extended operating position, do not cause a back and forth movement of the main flap support link and result in an oscillating change of flap angle relative to the chord plane of the airfoil.

5. A variable camber flap having a linkage mechanism for extending the flap from a stowed position within the undersurface of an airfoil to a first forward and downward extended operating position forming an aerodynamic slot with the leading edge of the airfoil, and a second extended operating position whereat the aerodynamic slot is closed off, said flap comprising: a bendable flap panel supported from the leading edge portion of the airfoil at said first operative position; a flap nose structure movable relative to the bendable flap panel and forming a blunt leading edge therefore; a driving arm mounted to fixed structure of the airfoil for rotation in a chordwise plane; a support arm spaced chordwise aft of the driving arm and mounted at its upper end to fixed structure of the airfoil for rotation in a chordwise plane; a main flap support link extending chordwise fore and aft, and being pivotally connected at its aft end to the lower end of the support arm and pivotally connected at its forward end to a trailing edge portion of the flap; an interconnecting link pivotally connected at its lower end to the lower end of the driving arm and pivotally connected at its upper end to an intermediate portion of the main flap support link; a flap chord link pivotally supported at its upper end from the forward portion of the main flap support link and said flap chord link being pivotally connected at its lower end to a leading edge portion of the bendable flap panel; a secondary flap support link comprising a Y-bellcrank having the intersection of its three arms pivotally connected to an intermediate section of the flap chord link, a first of said arms spaced below and approximately parallel to the main flap support link and extending aft from the flap chord link connection to a common pivotal connection with the lower ends of both the driving arm and the interconnecting link, the second of said arms being connected to the flap nose structure for moving said flap nose structure relative to the bendable flap panel, and the third of said arms being connected to an intermediate section of the bendable flap panel for controllably bending said panel; a first means interposed between the driving arm and the main flap support link for initially maintaining a fixed pivotal relationship therebetween during movement of the flap from the stowed position to said first operating position; stop means for limiting further forward rotational movement of the support arm from said first operating position; and said first means releasing the driving arm from the fixed pivotal relationship with the main flap support link when the flap has reached said first operating position, for permitting a further movement of the driving arm to extend the flap to said second operating position whereat the aerodynamic slot is closed off.

6. The variable camber flap as set forth in claim 5, further including a second means comprising: a cam hook off-set from the center of rotation of the driving arm and mounted for rotation therewith; a follower pin fixedly attached to the support arm; and said cam hook clasping the follower pin during extension of the flap to said first operating position for locking the support arm against any further movement thereof.

7. The variable camber flap as set forth in claim 5, wherein said first means comprises: a cam fixedly attached to the main flap support link at the pivotal connection of the interconnecting link to the intermediate portion of the main flap support link; a follower fixedly attached to the driving arm; and said first means initially providing for said fixed pivotal interconnecting relationship between the main flap support link and the driving arm during extension of the flap to said first operating position, and then providing for a movable relationship therebetween when the flap is moved between said first and second operating positions.

8. The variable camber flap as set forth in claim 6, wherein said first and second means are sequenced in their operating functions such that said second means starts to lock the support arm against further movement before said first means releases the driving arm from said fixed pivotal relationship with the main flap support link, in order that the air loads acting on the flap when at said first operating position, do not cause a back and forth movement of the main flap support link and result in an oscillating change of flap angle relative to the chord plane of the airfoil.

9. A variable camber flap and linkage mechanism for extending the flap from a stowed position within the undersurface of an airplane wing to a first forward and downward extended operating position forming an aerodynamic slot with the leading edge of the wing, and a second extended operating position whereat the aerodynamic slot is closed off, comprising: a bendable flap panel supported from the leading edge portion of the wing at said first operative position; a flap nose structure movable relative to the bendable flap panel and forming a blunt leading edge therefore; a driving arm mounted to fixed wing structure for rotation fore and aft in a chordwise plane; a support arm spaced chordwise aft of the driving arm and mounted at its upper end to fixed wing structure for rotation fore and aft in a chordwise plane; a main flap support link, extending fore and aft chordwise, and being pivotally connected at its aft end to the lower end of the support arm, and pivotally connected at its forward end to a trailing edge portion of the bendable flap panel; an interconnecting link in approximate parallel alignment with the driving arm, pivotally connected at its lower end to the lower end of the driving arm and pivotally connected at its upper end to an intermediate portion of the main flap support link; a flap chord link spaced forward chordwise of the driving arm and approximately parallel thereto; said flap chord link being pivotally supported at its upper end from the forward portion of the main flap support link and pivotally connected at its lower end to the leading edge portion of the downwardly and forwardly extending bendable flap panel; a secondary flap support link comprising a Y-bellcrank having the intersection of its three arms pivotally connected to an intermediate section of the flap chord link, a first of said arms extending horizontally aft from the flap chord link connection to a common pivotal connection with the lower ends of both the driving arm and the interconnecting link, the second of said arms being connected to the flap nose structure for moving said flap nose structure relative to the bendable flap panel, and the third of said arms being connected to an intermediate section of the bendable flap panel for controllably bending said panel; stop means for limiting further forward rotational movement of the support arm from said first operating position; a second cam mechanism interposed between the driving arm and the support arm for locking the support arm against further forward movement from said first operating position; a first cam mechanism interposed between the driving arm and the main flap support link for initially maintaining a fixed pivotal relationship therebetween during transition of the variable camber flap from the stowed position to said first operating position; said first cam mechanism releasing the driving arm from the fixed pivotal relationship with the main flap support link when the variable camber flap is at said first operating position and permitting a further forward movement of the driving arm so as to extend the variable camber flap to said second operating position whereat the aerodynamic slot is closed off.

10. The variable camber flap and linkage mechanism as set forth in claim 9, wherein said second cam mechanism comprises: a cam hook off-set from the center of rotation of the driving arm and mounted for rotation therewith; a follower pin fixedly attached to the support arm; and said cam hook clasping the follower pin during extension of the flap to said first operating position for locking the support arm against any further movement thereof.

11. The variable camber flap and linkage mechanism as set forth in claim 9, wherein said first cam mechanism comprises: a cam fixedly attached to the main flap support link at the pivotal connection of the interconnecting link to the intermediate portion of the main flap support link; a follower fixedly attached to the driving arm; and said first cam mechanism initially providing for said fixed pivotal interconnecting relationship between the main flap support link and the driving arm during extension of the flap to said first operating position, and then providing for a movable relationship therebetween when the flap is moved between said first and second operating positions.

12. The variable camber flap and linkage mechanism as set forth in claim 9, wherein said first and second cam mechanisms are sequenced in their operating functions of alternate restraint and release of certain members of the flap linkage mechanism, such that said second cam mechanism begins to lock the support arm against further movement, before said first cam mechanism releases the driving arm from said fixed pivotal relationship with the main flap support link, in order that the air loads acting on the variable camber flap, when said flap is at said first operating position, do not cause a back and forth movement of the main flap support link and result in an oscillating change-of-flap-angle relative to the wing, whereby the variable camber flap becomes unstable backwards.

13. A pair of spanwise spaced sets of linkage mechanisms arranged and actuated in a chordwise plane for extending a flap member from a stowed position within the undersurface of an airfoil to a forward and downward extended operating position, each of said flap linkage mechanisms comprising: a driving arm mounted to fixed structure of the airfoil for rotation in a chordwise plane; a support arm spaced chordwise aft of the driving arm and mounted at its upper end to fixed structure of the airfoil for rotation in a chordwise plane; a main flap support link extending chordwise fore and aft, and being pivotally connected at its aft end to the lower end of the support arm and pivotally connected at its forward end to a trailing edge portion of the flap member; a flap chord link pivotally supported at its upper end from the forward portion of the main flap support link and pivotally connected to its lower end to a leading edge portion of the flap member; a secondary flap support link spaced below and approximately parallel to the main flap support link, and being pivotally connected at its forward end to an intermediate section of the flap chord link and pivotally connected at its aft end to the lower end of the driving arm; said flap member being fastened through a chordwise series of ball joint pivotal connections, to said pair of spanwise spaced sets of flap linkage mechanisms; and actuator means for rotating the driving arm of each of said pair of flap linkage mechanisms the same number of degrees of rotation for movement of the flap member to said operating position; stop means for arresting the forward rotational movement of the support arm of one spanwise set of flap linkage mechanisms at a different degree of angular rotation relative to the other, for bending and torsionally twisting the flap member in a spanwise plane to impart a spanwise varying camber thereto during movement of the flap member from its stowed position to said operating position.

14. A variable camber leading edge flap member having a series of spanwise spaced sets of linkage mechanisms arranged and actuated in a chordwise plane for extending the flap member from a stowed position within the undersurface of an airfoil to a forward and downward extended operating position, each spanwise spaced set of flap linkage mechanisms comprising: a driving arm mounted to a fixed structure of the airfoil for rotation in a chordwise plane; a support arm spaced chordwise aft of the driving arm and mounted at its upper end to fixed structure of the airfoil for rotation in a chordwise plane; a main flap support link extending chordwise fore and aft, and being pivotally connected at its aft end to the lower end of the support arm and pivotally connected at its forward end to a trailing edge portion of the flap member; a flap chord link pivotally supported at its upper end from the forward portion of the main flap support link and pivotally connected at its lower end to a leading edge portion of the flap member; a secondary flap support link spaced below and approximately parallel to the main flap support link, and being pivotally connected at its forward end to an intermediate section of the flap chord link and pivotally connected at its aft end to the lower end of the driving arm; ball-joint connections between said flap member and said series of spanwise spaced sets of flap linkage mechanisms; actuator means for rotating the driving arm of each of the spanwise located flap linkage mechanisms, the same number of degrees of rotation to move the flap member from the stowed position to the extended operating position; and stop means for arresting forward rotational movement of the support arm of each of said series of spanwise spaced sets of flap linkage mechanisms, at said extended operating position, so as to vary the flap angle spanwise along the leading edge of the airfoil to improve the aerodynamic efficiency of the airfoil and flap member combination.

15. A variable camber flap member having a series of spanwise spaced sets of linkage mechanisms arranged and actuated in a chordwise plane for extending the flap member from a stowed position within the undersurface of an airfoil to a forward and downward extended operating position, said flap member comprising: a bendable flap panel supported from the leading edge portion of the airfoil at said extended operative position; a flap nose structure movable relative to the bendable flap panel and forming a blunt leading edge therefore; each spanwise spaced set of linkage mechanisms comprising, a driving arm, a support arm, a main flap support link, a flap chord link, and a secondary flap support link; said driving arm being mounted to a fixed structure of the airfoil for rotation in a chordwise plane; said support arm being spaced chordwise aft of the driving arm and mounted at its upper end to fixed structure of the airfoil for rotation in a chordwise plane; said main flap support link extending chordwise fore and aft, and being pivotally connected at its aft end to the lower end of the support arm and pivotally connected at its forward end to a trailing edge portion of the flap; said flap chord link being pivotally supported at its upper end from the forward portion of the main flap support link and said flap chord link being pivotally connected at its lower end to a leading edge portion of the bendable flap planel; said secondary flap support link comprising a Y-bellcrank having the intersection of its three arms pivotally connected to an intermediate section of the flap chord link, a first of said arms spaced below and approximately parallel to the main flap support link and extending aft from the flap chord link connection to the lower end of the driving arm; the second of said arms being connected to the flap nose structure for moving said flap nose structure relative to the bendable flap panel, and the third of said arms being connected to an intermediate section of the bendable flap panel for controllably bending said panel; ball-joint connections between said flap member and said series of spanwise spaced sets of flap linkage mechanisms; actuator means for rotating the driving arm of each of the spanwise located flap linkage mechanisms, the said number of degrees of rotation to move the flap member from the stowed position to the extended operating position; stop means for arresting forward rotational movement of the support arm at a different number of degrees of rotation for each of said series of spanwise spaced sets of flap linkage mechanisms, at said extended operating position, so as to vary the flap angle spanwise along the leading edge of the airfoil to improve the aerodynamic efficiency of the airfoil and flap member combination.

* * * * *